Jan. 28, 1941.  G. A. TINNERMAN  2,229,708
FASTENING MEANS
Original Filed Oct. 30, 1937

Inventor
GEORGE A. TINNERMAN

By H. L. Lombard
Attorney

Patented Jan. 28, 1941

2,229,708

UNITED STATES PATENT OFFICE 2,229,708

FASTENING MEANS

George A. Tinnerman, Cleveland, Ohio, assignor, by mesne assignments, to Tinnerman Products, Inc., Cleveland, Ohio, a corporation of Ohio Original application October 30, 1937, Serial No. 171,998. Divided and this application October 5, 1940, Serial No. 359,960

14 Claims. (Cl. 85—5)

This invention relates to molding installations, and the like, embodying means for attaching metallic moldings, metal trim or finishing objects to supporting structures, particularly metallic supports such as found in automobile bodies, various sheet metal structures, gas or electric ranges, metal partitions, door frames, window frames, refrigerator cabinets and many other assemblies comprising metal sheet material, fibre board, glass, vitreous coated sheets and surfaces formed of hardened plastic compositions.

The present application is a division of copending application Serial Number 171,998, filed October 30, 1937 and since issued as Patent Number 2,225,394, December 17, 1940.

More particularly, the present invention relates to improved means for the attachment of moldings and like objects to a supporting structure comprising connector or retainer devices effecting an interlocking engagement between the molding or trim object and the supporting structure in combination with spring fastenings securing the retainer or connecting devices to the supporting structure under continuous spring tension thereby providing an installation in which the molding or trim object is fixed and rigid in applied position and not subject to loosening, displacement or possible removal incident to strain, vibration and jarring effects.

Heretofore, metallic trim material has usually been attached to a supporting structure by means of wire or sheet metal clips having cooperative engagement with the molding or trim material and capable of being applied to apertures in the supporting structure in the manner of a snap-stud. However, it has been found that snap-stud clips of this character, when employed in an installation subject to any material degree of strain and vibration as, for example, takes place in an automobile body, are inefficient and impractical in that they tend to work free from applied position to the extent that the trim material becomes loose and often completely removed resulting in an unsightly appearance and causing objectionable squeaks, rattles and other annoying sounds in the operation of the automobile.

Furthermore, in the application of relatively wide trim material such snap-stud clips are not practical in that they must necessarily be constructed of comparatively fine wire or sheet metal strip material, and accordingly, no adequate, positive, connection of the clips to the relatively wide trim material may be obtained; it has therefore been necessary to attach such relatively wide trim material by means of bolts provided with enlarged heads designed to seat within the molding and cooperate with conventional nut devices for securing the trim material to the supporting structure. However, the attachment of trim material by means of such bolt fastenings is laborious and time consuming, requires the use of lock washers and is not always effective in that, even with the use of lock washers, the installation becomes loose by reason of the fact that the enlarged bolt heads are not resilient and do not have a fixed, rigid engagement with the molding in their initial attachment and subsequently work loose to cause objectionable squeaks and rattles.

It is therefore a primary object of this invention to provide an arrangement for attaching superposed parts and securing finishing objects such as moldings and like trim material to supporting structures without the use of threaded fasteners of any kind or of snap-stud clips, and in such manner that the part or object secured is installed in a fixed, rigid mounting under spring tension and is not subject to loosening or displacement either in the connection of the retaining means with the object or part supported, or in the means for securing the assembly to the supporting structure.

Another object of the invention is to provide an installation comprising a hollow molding and spring retainer devices to secure it in place on a support, which retainer devices are sprung into interlocking relation with the molding and normally maintained in applied position along the length thereof due to their inherent resiliency.

Still another object of the invention it to provide in such an installation an arrangement by which the mounting of the molding on the supporting structure is under continuous spring tension supplied by spring securing means cooperating with the individual retainer devices assembled in the molding.

A further object of the invention is to provide an installation for attaching a molding or other object to a supporting structure by spring metal retainer means having shank elements designed for cooperative engagement with spring locking plates which, in applied position, are adapted to draw the molding toward the supporting structure in providing a fixed, rigid, resilient mounting.

A still further object contemplates the provision of an installation comprising a resilient retainer or connector means having a fixed, rigid interlocking under spring tension with the member ber to be mounted, and in which the retainer is secured to the supporting structure by a locking plate also supplying spring tension, thereby providing a resilient installation in which the members are united in locked relation under spring tension throughout.

A further object comprehends in an installation embodying a resilient retainer and spring locking plate for mounting a member on a support, an arrangement providing a continuously effective spring holding action exerted axially of the retainer by the locking plate to draw the member to be mounted in close engagement with the support, and with the resilience of the locking plate and the resilience of the retainer mutually contributing to the effectiveness of this spring holding action.

Another object of the invention is for the provision of an improved fastening means comprising a retainer device having an enlarged wire body adapted for resilient engagement under spring tension with the molding or other object, and which retainer is simple, inexpensive, and economically manufactured from a minimum of stock without loss or waste of material.

A further object of the invention is to provide such fastening means including a one-piece, resilient retainer for attaching an object to a supporting structure, comprising an enlarged loop body and a member dependent therefrom providing a shank adapted for locking engagement with a spring locking plate in applied position.

A still further, more specific object is the provision of such a spring retainer constructed of a single piece of wire and having an integral projecting portion providing a shank adapted for locking engagement with a spring locking plate.

Further objects and advantages and other new and useful features in the construction, arrangement and general combination of parts of the invention will be apparent to those skilled in the art as a description thereof proceeds with reference to the accompanying drawing, for purposes of illustration but not of limitation, in which like reference characters designate like parts throughout the same and in which.

Figure 1:
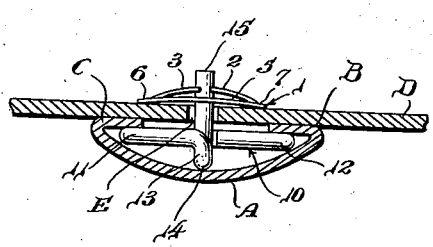
Fig. 1 is a cross-sectional view of an installation embodying the cooperating wire retainer and spring locking plate devices of the invention.
Figure 3:
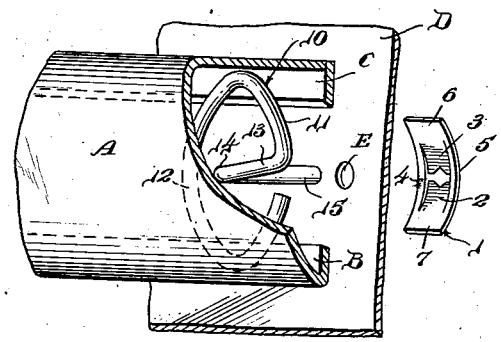
Fig. 3 is a perspective of the retainer as assembled in interlocking relation in a molding preparatory to the application thereof to a support to be secured by a spring locking plate.
Figure 4:
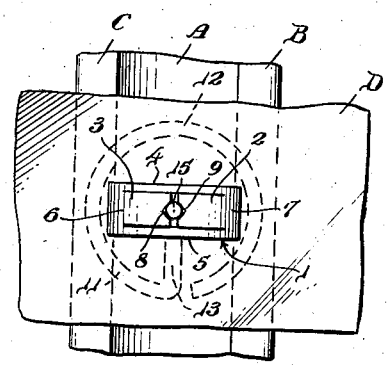
Fig. 4 is a plan view of the completed molding installation represented in Fig. 1; and, Fig. 5 is a fragmentary plan view, similar to Fig. 4, showing the locking plate on an enlarged scale to illustrate the fastening action thereof.

Referring now, more particularly, to the drawing, Figs. 1, 3 and 4 show a molding installation embodying a preferred form of wire retainer means assembled in the molding in interlocking engagement therewith and secured to a supporting structure of any suitable character by a spring locking plate. The letter A designates generally a fragment of a channel-shaped form of metallic molding comprising inturned base flanges B, C, for example. The supporting structure is designated generally D, and inasmuch as the instant invention is intended mainly for use in the construction of metallic structures, such supporting structure usually consists of a metallic panel or other plate-like element, as illustrated. In order that the molding, trim material or other object may be secured thereto, said supporting structure D is provided with perforations E, disposed at regular intervals and at suitably spaced points along which the trim material extends in mounted position. Such perforations may be either round or rectangular but preferably are round as shown in Fig. 3, to snugly receive the substantially round shank of the wire retainer in the most effective manner in a completed installation. The said perforations E may be provided in the member constituting the support as by punching prior to the application of the molding thereto or the installation thereof as a part of a completed structure, and may also be formed in any other convenient manner as by tapping or drilling.

The molding which is to be mounted in accordance with the present invention is usually in the form of a channel-shaped strip although it is contemplated that the procedure of the instant invention be followed in securing moldings, trim strips and objects of any other configuration or cross-section. As shown in Figs. 1 and 3, the sides of the molding or trim material are each bent inwardly providing abutments or base flanges B, C, extending continuously along each side of the channel-shape and adapted for interlocking engagement with the retainer or connecting means on being mounted to the support, as hereinafter set forth. The body of the molding intermediate the base flanges or abutments may be of any desired configuration or design for ornamental and artistic purposes. However, for the purposes of the present invention, it is only necessary that the molding, trim strip, or other finishing object be provided with some form of abutment means, or the like, on the underface thereof adapted for cooperative engagement with a form of wire retainer having a shank element which may be secured to the supporting structure by a spring locking plate, as presently to be described.

Figure 2:
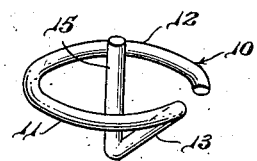
Fig. 2 is a perspective of the wire retainer per se.

As best seen in Fig. 2, a preferred form of retainer 10, is shown constructed of a single piece of heavy gauge wire, or the like, the midportion of which is bent in the form of a substantial loop 11 providing an enlarged resilient body portion 12 which includes one end of the wire. The opposite end of the wire is bent out of the plane of the loop as at 13 to provide a head or trolley element 14 for a purpose presently to be described. This end of the wire is further bent substantially at right angles to the plane defined by the resilient loop of said body 12 to form the shank 15 of the retainer. Preferably, wire retainers of this form are bent prior to tempering, and after having been suitably bent are tempered to give the necessary stiffness and resilience. This resilience is inherent in the retainer throughout and accordingly permits the body portion 12 to be sprung easily into interlocking relation with the flange edges B, C, of the molding A, Fig. 3, preparatory to the application of the assembly to the supporting member D with the projecting shank 15 thereof passing through the aperture E provided therein.

When the body portion 12 is sprung into interlocking relation with the base flanges of the molding, the head portion 14 serves as a substantially round trolley element engaging the roof of the molding to seat the retainer and rigidify the axial projecting relation of the shank 15 thereof as shown in Fig. 1. Thus, the resilient loop permits the ready approximate location of a retainer along the length of the molding and in suitable spaced relation to the spacing of the apertures in the preperforated supporting structure, while the contacting relation of the trolley element 14, Fig. 1, against the roof of the molding provides a firm, snug engagement of the retainer in applied position with the shank 15 thereof projecting substantially rigidly from the molding, thereby ensuring a tight, rigid installation under continuous spring tension when the spring locking plate is applied. Thus, due to their inherent resiliency and the said frictional engagement, the retainers are maintained in normal applied position along the length of the molding and in this relation serve to connect the molding to the supporting member under spring tension. In a still further relation, this resilient arrangement for applying the retainers in fixed relation in the molding is highly advantageous from the standpoint of economy and speed in assembling operations in mass production in that the retainers may be assembled in definite spaced relation in the moldings, and the assemblies stacked in numbers ready for use, whereupon an operator on an assembly line may quickly mount a molding without stopping to attach the retainers or to align the shanks thereof with the apertures in the preperforated supporting member.

The spring locking plates 1, are provided from relatively thin sections of any suitable sheet metal such as cold rolled metal, spring steel, or the like, and may be round or of any suitable configuration, but quite obviously, are most economically constructed from generally rectangular sections obtained from strip stock without loss or waste of material. Such a section providing a locking plate is suitably slit and formed within its periphery to define a plurality of yieldable tongues 2, 3, or the like, projecting out of the plane thereof and adapted for frictional locking engagement with the shank of a retainer under spring tension. A preferred form of spring locking plate comprises opposed, yieldable tongues 2, 3, extending upwardly in substantial ogee formation intermediate bridge portions 4, 5, and end portions 6, 7, providing, what may be termed, the body of the locking plate which body is flexible and resilient and is so formed in the stamping operation as to have a pronounced, generally concave configuration in normal, untensioned relation. The extremities of the tongues 2, 3, are V-notched as at 8, 9, Figs. 4 and 5, thereby providing opposed substantial jaws designed for especially effective biting engagement with the generally round shank of the wire retainer, as hereinafter more fully set forth. Since the body of the locking plate is flexible, the tongue elements 2, 3, are necessarily relatively yieldable with respect to each other and readily adapted for sliding engagement with the shank of a retainer in one direction and accordingly, may be speedily applied to fastening position by a substantial axial thrust-like motion in a minimum of time and effort and flattened in such fastening position thereby fixedly securing the assembled members of an installation under spring tension.

From the foregoing it may be understood that a molding, trim strip or other finishing object may be secured to a supporting member by means of the cooperating retainer and spring locking plate devices, just described, in substantially the following manner. The retainer 10, comprising flexible body 12 and integral shank 15 is disposed in interlocking relation with the molding A by springing the said flexible body 12 into abutting engagement with the base flanges B, C, of the molding; preferably, the retainer element 13 is so designed as to provide a portion 14 in contact with the roof of the molding in applied position, as shown in Fig. 1, to rigidify the axial projecting relation of the shank 15 thereof with respect to the molding. As many of such retainers as necessary are applied in this manner depending on the length of the molding and are so positioned therein that the shanks 15 thereof are disposed in such spaced relation as to correspond substantially with the spacing of the apertures E in the preperforated supporting structure D. The molding provided with the retainers assembled therein in such suitable spaced relation, is then brought to the preperforated supporting member and the shanks of the retainers fitted into the perforations and the molding pressed into snug engagement with the adjacent surface of the support with said shanks 15 projecting therethrough onto the reverse side.

The spring locking plates 1, are then applied to the projecting shanks 15 of the individual retainers and pressure exerted in a substantial axial, thrust-like movement in which the yieldable tongues 2, 3, of a retainer are caused to slide along the shank 15 to the point at which the end portions 6, 7, of the generally concave base, contact the adjacent surface of the supporting member D. At such point, upon continued pressure on the generally concave base of the locking plate, the end portions 6, 7 thereof are moved from their initial, normally untensioned position in the generally concave base outwardly and upwardly in a substantial lifting force which is transmitted to the tongues to urge the notched extremities 8, 9 thereof inwardly toward each other to the extent that the said tongues are caused to dig into and become embedded in the shank of the retainer under spring tension and thereby resist any tendency toward reverse movement or loosening. At the same time, the bowed bridge portions 4, 5, are elongated such that the generally concave base assumes the position of a substantially flat section, Fig. 1, which, in attempting to assume its initial, normally untensioned, concave configuration naturally tends to draw the shank of the retainer axially thereby taking up any clearance in the assembled parts and rigidly securing the molding or other connected part to the supporting structure under continuous spring tension. In this way the locking plates exert a continuously effective spring holding action axially of the shanks of the retainers, thereby drawing the molding toward the supporting structure, with the resilience of the locking plates and the resilience of the body portions 12 of the retainers mutually contributing to the effectiveness of this action.

This most advantageous axial drawing action supplied by the spring locking plates to provide a tight rigid installation, is effected by the tensioned end portions 6, 7 and bridge portions 4, 5 which are moved from their pronounced, concave configuration when normally untensioned as represented in Fig. 3 to assume the position of a substantially thin, flat section in applied position as shown in Fig. 1. And accordingly, the said tensioned bridge and end portions in attempting to assume their intial, normally untensioned relation, produce a pronounced bending moment which not only effects a locking of the tongues 2, 3 by urging the notched extremities thereof into biting engagement with the shank 15 of the retainer, but also, positively draws the shank of the retainer axially to take up any clearance between the assembled members, and otherwise provide a fixed, rigid installation under continuous spring tension. It has been found that this most effective locking and drawing action of the spring locking plates to provide a tight, rigid installation is best obtained when the concave bases thereof are flattened without any substantial pressure being exerted on the tongue elements themselves inasmuch as any substantial pressure on the tongues prevents the same from having smooth sliding engagement with the shank of the retainer on being applied, and also deforms the same with respect to the generally concave base such that the extremities thereof are not in most effective contact with the cooperating shank, wherefore the tongues may have a tendency to slip and permit the locking plate to loosen from applied position. This application of the spring locking plates is preferably effected by the use of a special tool comprising spaced jaws which may be fitted to the bridge portions 4, 5, of the locking plates without contacting the tongues elements 2, 3. Thus, by substantial axial thrust, pressure may be applied to the bridge portions to flatten and tension the same in the generally concave base of the locking plate without deforming the tongues; and accordingly, when the tool is withdrawn and the attendant pressure removed from the said flattened bridge portions, the tension stored therein causes the tongues to become embedded in the shank by substantial line contact and, at the same time, necessarily causes an axial drawing action on the shank of the retainer thereby providing a locked, tightened installation.

Figure 5:
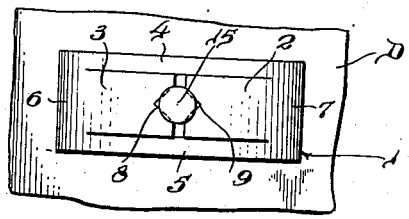

Referring to Figs. 4 and 5, it will be understood that the cross-section of the shank 15 of the retainer is generally comparatively small compared to the size of spring locking plate required to be employed therewith for the necessary strength and durability in an installation. In order to obtain the necessary locked fastening action of the tongues 2, 3, with such a shank of relatively small cross-section, and at the same time provide the required strength therein to reliably secure such an installation composed of comparatively heavy parts, for example, said tongues 2, 3 are provided from the body of the locking plate 1, of relatively greater width than the diameter of the shank 15. The extremities of said tongues thus present relatively wide opposing straight edge surfaces which are provided with the V-shaped notches 8, 9, to define substantial jaws adapted for pronounced, positive biting engagement with the retainer shank 15.

By means of said V-shaped notches 8, 9, the tongue extremities are adapted to cut into the retainer shank at spaced points on either side thereof with progressively increasing force until such tongue extremities are definitely embedded in the retainer shank to a substantial degree in the application of the locking plate to applied fastening position, as aforesaid, and subtsantially as represented by dotted lines in Fig. 5. In this relation, the intersecting straight edge and V-shaped portions of the tongue extremities define sharp points which are also embedded in the retainer shank to cooperate with the edges of the V-notched jaws in locking the tongues to the retainer shank in a manner to maintain the locking plate against relative rotative or other movement tending toward loosening or displacement thereof from its most effective applied fastening position.

While the invention has been described in detail with a specific example, such example is intended as an illustration only, since it will be apparent to those skilled in the art that other modifications in the construction, arrangement and general combination of parts thereof may be devised without departing from the spirit and scope of the invention. The present embodiment is therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. Fastening means for securing parts under continuous spring tension comprising cooperating retainer and spring locking plate devices, said retainer comprising a resilient, wire body for resiliently engaging one of said parts and provided with a shank for extending through an opening in a cooperating part, and said locking plate comprising a sheet metal base provided with a pair of cooperating shank engaging elements having their extremities spaced apart for receiving said shank and designed for locking biting engagement therewith under spring tension in cooperation with the base of said locking plate in resilient engagement with the adjacent face of said cooperating part, said resilient wire body of the retainer and said sheet metal locking plate cooperating to provide a connection which is resilient at either side of said secured parts.

2. Fastening means for securing parts under continuous spring tension comprising cooperating retainer and spring locking plate devices, said retainer comprising a resilient, wire body for resiliently engaging one of said parts and provided with a shank for extending through an opening in a cooperating part, and said locking plate comprising a sheet metal device provided with a generally concave base and a pair of cooperating shank engaging elements having their extremities spaced apart for receiving said shank and designed for locking biting engagement therewith under spring tension in cooperation with the base of said locking plate in resilient engagement with the adjacent face of said cooperating part in applied fastening position, said generally concave base of the locking plate being adapted to exert an axial drawing action on the shank of the retainer in such applied fastening position, and said resilient wire body of the retainer and said sheet metal locking plate cooperating to provide a connection which is resilient at either side of said secured parts.

3. Fastening means for securing parts under continuous spring tension comprising cooperating retainer and spring locking plate devices, said retainer comprising a resilient, wire body for resiliently engaging one of said parts and provided with a shank for extending through an opening in a cooperating part, and said locking plate comprising a sheet metal base provided with a pair of cooperating shank engaging elements having their extremities spaced apart for receiving said shank of the retainer, at least one of said extremities being notched to provide a substantial jaw designed for locking biting engagement with the retainer shank under spring tension in cooperation with the base of said locking plate in resilient engagement with the adjacent face of said cooperating part.

4. Fastening means for securing parts under continuous spring tension comprising cooperating retainer and spring locking plate devices, said retainer comprising a resilient, wire body for resiliently engaging one of said parts and provided with a shank for extending through an opening in a cooperating part, and said locking plate comprising a sheet metal device provided with a generally concave base and a pair of cooperating shank engaging elements having their extremities spaced apart for receiving said shank of the retainer, at least one of said extremities being notched to provide a substantial jaw designed for locking biting engagement with the retainer shank under spring tension in cooperation with the base of said locking plate in resilient engagement with the adjacent face of said cooperating part in applied fastening position, said generally concave base of the locking plate being adapted to exert an axial drawing action on the shank of the retainer in such applied fastening position.

5. Fastening means for securing parts under continuous spring tension comprising cooperating retainer and spring locking plate devices, said retainer comprising a resilient, wire body for resiliently engaging one of said parts and provided with a shank for extending through an opening in a cooperating part, and said locking plate comprising a sheet metal base provided with a pair of cooperating shank engaging elements having their extremities spaced apart for receiving said shank of the retainer, said extremities being notched to provide substantial jaws designed to cut into the retainer shank in locking engagement therewith under spring tension in cooperation with the base of said locking plate in resilient engagement with the adjacent face of said cooperating part.

6. Fastening means for securing parts under continuous spring tension comprising cooperating retainer and spring locking plate devices, said retainer comprising a resilient, wire body for resiliently engaging one of said parts and provided with a shank for extending through an opening in a cooperating part, and said locking plate comprising a sheet metal device provided with a generally concave base and a pair of cooperating shank engaging elements having their extremities spaced apart for receiving said shank of the retainer, said extremities being notched to provide opposing substantial jaws designed to cut into the retainer shank in locking engagement therewith under spring tension in cooperation with the base of said locking plate in resilient engagement with the adjacent face of said cooperating part in applied fastening position, said generally concave base of the locking plate being adapted to exert an axial drawing action on the shank of the retainer in such applied fastening position.

7. Fastening means for securing parts under continuous spring tension comprising cooperating retainer and spring locking plate devices, said retainer comprising a resilient, wire body for resiliently engaging one of said parts and provided with a shank for extending through an opening in a cooperating part, and said locking plate comprising a sheet metal base provided with a substantial tongue struck and formed therefrom and defining an opening for receiving said shank of the retainer, the extremity of said tongue being designed for locking biting engagement with the retainer shank under spring tension in cooperation with the base of said locking plate in resilient engagement with the adjacent face of said cooperating part.

8. Fastening means for securing parts under continuous spring tension comprising cooperating retainer and spring locking plate devices, said retainer comprising a resilient, wire body for resiliently engaging one of said parts and provided with a shank for extending through an opening in a cooperating part, and said locking plate comprising a sheet metal device provided with a generally concave base and a substantial tongue struck and formed therefrom and defining an opening for receiving said shank of the retainer, the extremity of said tongue being designed for locking biting engagement with the retainer shank under spring tension in cooperation with the base of said locking plate in resilient engagement with the adjacent face of said cooperating part in applied fastening position, said generally concave base of the locking plate being adapted to exert an axial drawing action on the retainer shank in such applied fastening position.

9. Fastening means for securing parts under continuous spring tension comprising cooperating retainer and spring locking plate devices, said retainer comprising a resilient, wire body for resiliently engaging one of said parts and provided with a shank for extending through an opening in a cooperating part, and said locking plate comprising a sheet metal base provided with cooperating tongues struck and formed therefrom and having spaced extremities defining an opening for receiving said shank of the retainer, said extremities of the tongues being notched to provide substantial jaws adapted to cut into the retainer shank in locking engagement therewith under spring tension in cooperation with the base of said locking plate in resilient engagement with the adjacent face of said cooperating part, said resilient wire body of the retainer and said sheet metal locking plate cooperating to provide a connection which is resilient at either side of said secured parts.

10. Fastening means for securing parts under continuous spring tension comprising cooperating retainer and spring locking plate devices, said retainer comprising a resilient, wire body for resiliently engaging one of said parts and provided with a shank for extending through an opening in a cooperating part, and said locking plate comprising a sheet metal device provided with a generally concave base and cooperating tongues struck and formed therefrom and having spaced extremities defining an opening for receiving said shank of the retainer, said extremities of the tongues being notched to provide substantial jaws adapted to cut into the retainer shank in locking engagement therewith under spring tension in cooperation with the base of said locking plate in resilient engagement with the adjacent face of said cooperating part in applied fastening position, said generally concave base of the locking plate being adapted to exert an axial drawing action on the retainer shank in such applied fastening position, and said resilient wire body of the retainer and said sheet metal locking plate cooperating to provide a connection which is resilient at either side of said secured parts.

11. Fastening means for securing a molding or the like to a supporting part under continuous spring tension, said fastening means comprising cooperating retainer and spring locking plate devices, said retainer comprising a resilient wire body adapted for resilient interlocking engagement with said molding and provided with a shank for extending through an opening in said supporting part, and said locking plate comprising a sheet metal base provided with a pair of cooperating shank engaging elements having their extremities spaced apart for receiving said shank of the retainer and designed for locking biting engagement therewith under spring tension in cooperation with the base of said locking plate in resilient engagement with the adjacent face of said supporting part.

12. Fastening means for securing a molding or the like to a supporting part under continuous spring tension, said fastening means comprising cooperating retainer and spring locking plate devices, said retainer comprising a resilient, wire body adapted for resilient interlocking engagement with said molding and provided with a shank for extending through an opening in said supporting part, and said locking plate comprising a sheet metal device provided with a generally concave base and a pair of cooperating shank engaging elements having their extremities spaced apart for receiving said shank of the retainer and designed for locking biting engagement therewith under spring tension in cooperation with the base of said locking plate in resilient engagement with the adjacent face of said supporting part in applied fastening position, said generally concave base of the locking plate being adapted to exert an axial drawing action on the shank of the retainer in such applied fastening position to draw the molding into tight engagement with said supporting part.

13. Fastening means for securing a molding or the like to a supporting part under continuous spring tension, said fastening means comprising cooperating retainer and spring locking plate devices, said retainer comprising a resilient, wire body adapted for resilient interlocking engagement with said molding and provided with a shank for extending through an opening in said supporting part, and said locking plate comprising a sheet metal base provided with cooperating tongues struck and formed therefrom and defining an opening for receiving said shank of the retainer, the extremities of said tongues being notched to provide substantial jaws adapted to cut into the retainer shank in locking engagement therewith under spring tension in cooperation with the base of said locking plate in resilient engagement with the adjacent face of said supporting part.

14. Fastening means for securing a molding or the like to a supporting part under continuous spring tension, said fastening means comprising cooperating retainer and spring locking plate devices, said retainer comprising a resilient, wire body adapted for resilient interlocking engagement with said molding and provided with a shank for extending through an opening in said supporting part, and said locking plate comprising a sheet metal device provided with a generally concave base and cooperating tongues struck and formed therefrom and defining an opening for receiving said shank of the retainer, the extremities of said tongues being notched to provide substantial jaws adapted to cut into the retainer shank in locking engagement therewith under spring tension in cooperation with the base of said locking plate in resilient engagement with the adjacent face of said supporting part in applied fastening position, said generally concave base of the locking plate being adapted to exert an axial drawing action on the retainer shank in such applied fastening position to draw the molding into tight engagement with said supporting part.

GEORGE A. TINNERMAN.